United States Patent [19]

Clarke

[11] 4,074,336
[45] Feb. 14, 1978

[54] PROTECTION CIRCUITS FOR COMPUTER BASED CONTROL SYSTEMS

[75] Inventor: Geoffrey Clarke, Blunsdon, near Swindon, England

[73] Assignee: Square D Company, Park Ridge, Ill.

[21] Appl. No.: 699,135

[22] Filed: June 23, 1976

[30] Foreign Application Priority Data

June 28, 1975 United Kingdom ............... 27420/75

[51] Int. Cl.² ............................................. H02H 7/20
[52] U.S. Cl. ...................................... 361/88; 361/107
[58] Field of Search ...................... 317/27 R, 33 R, 31, 317/33 SC; 235/153 A, 153 AK, 153 AE, 153 AM, 153 AP; 307/231; 328/92, 97; 361/88, 78, 86, 93, 98, 107

[56] References Cited

U.S. PATENT DOCUMENTS

| | | | |
|---|---|---|---|
| 3,193,666 | 7/1965 | Keir | 235/153 AK |
| 3,226,569 | 12/1965 | James | 235/153 AE X |
| 3,745,316 | 7/1973 | Olah | 235/153 A |
| 3,927,352 | 12/1975 | Schatz | 317/27 R |

*Primary Examiner*—J D Miller
*Assistant Examiner*—Patrick R. Salce
*Attorney, Agent, or Firm*—Harold J. Rathbun; R. J. Falkowski

[57] ABSTRACT

A computer based control system having a protection circuit including a bistable circuit arranged to disable the outputs of the control system at the end of a scan period of the system. The bistable circuit is operated through logic gates arranged to monitor fault in the control system.

5 Claims, 4 Drawing Figures

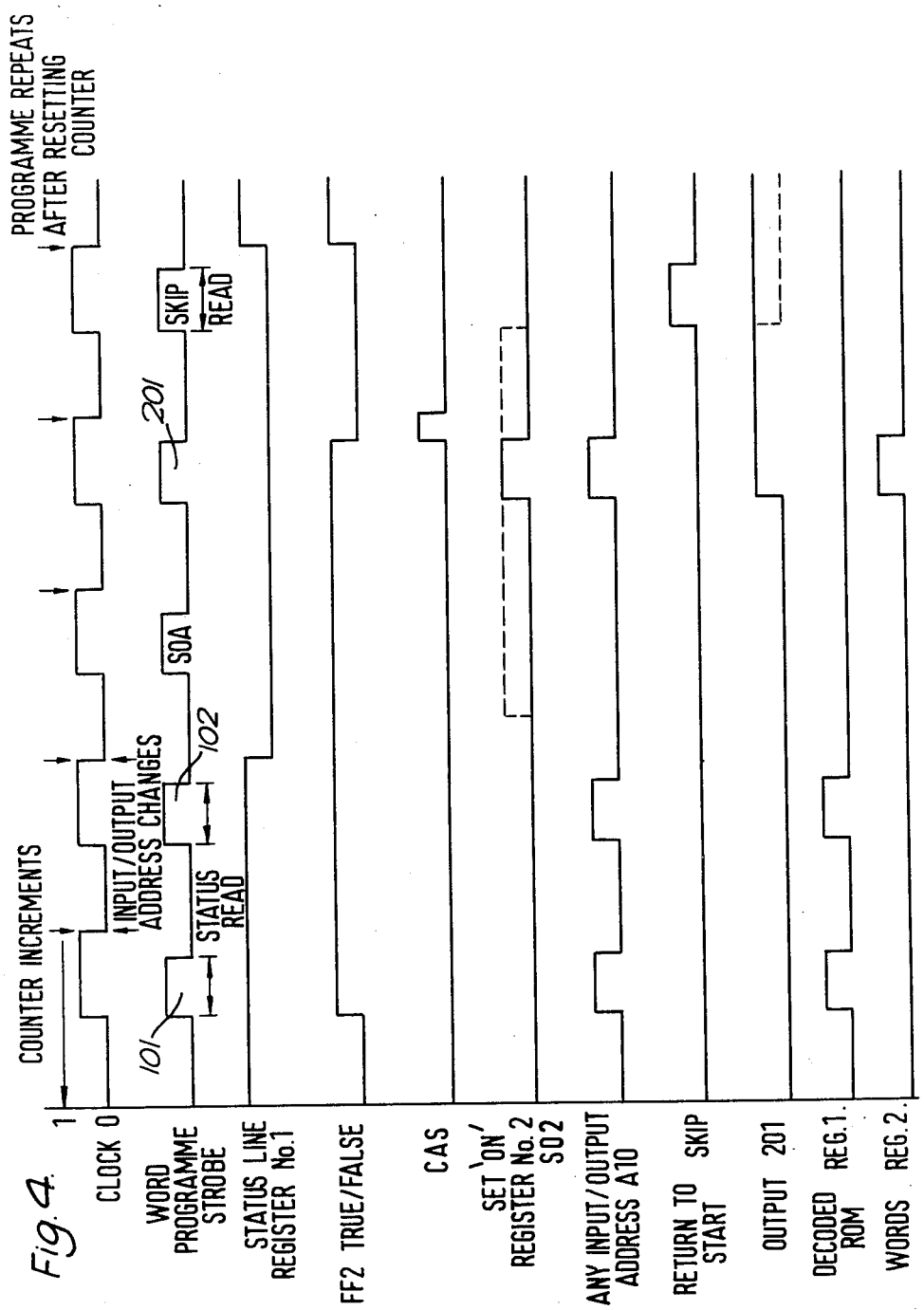

PROTECTION CIRCUITS FOR COMPUTER BASED CONTROL SYSTEMS

This invention relates to protection circuits for computer based control systems.

In the past few years there has been a considerable growth in the use of programmable controllers, computers and micro-processors for industrial control purposes. These systems offer many advantages over hard wired control systems, but suffer from the same failure modes which can result in one fault causing the system to fail to recognize relatively few inputs and permanently energizing relatively few outputs. The result may be damaging but not necessarily catastrophic. However, as hereinafter described, the computer based techniques of the programmable controllers and microprocessors are vulnerable to other and more calamitous failures in the presence of a single fault.

It is an object of the present invention to provide a protection circuit for a computer based control system, which protection circuit significantly improves the fail safe aspects of the system.

According to the present invention there is provided in a computer based control system, a protection circuit comprising first and second gating means, and disabling means to disable outputs of the control system on receiving a signal from said first gating means, an input of said first gating means being arranged to receive a signal at a predetermined time during, or at the end of a scan period of the control system, another input of said first gating means being connected to an output of said second gating means, said second gating means havng a number of inputs each connected to a respective part of the control system so that the said second gating means passes a signal to said first gating means on occurrence of a fault at any one of said parts of the control system to cause said first gating means to activate, at said predetermined time, said disabling means to disable all outputs of said control system.

Further, according to the present invention there is provided a protection circuit for a computer based control system, said protection circuit comprising a bistable circuit having an output connectible to outputs of the control system and an input connected to an AND gate which is arranged to receive a signal at a predetermined time during, or at the end of, a scan period of the control system, and which has an input connected to an output of an OR gate, the latter having inputs connectible to the control system such that the protection circuit can, at said predetermined time, monitor faults in the control system and disable all outputs thereof.

Embodiments of the present invention will now be described by way of example, with reference to the accompanying drawings, in which:

FIG. 4 shows timing diagrams of a simple programme applied to the control system of FIG. 3.

Figure 1:
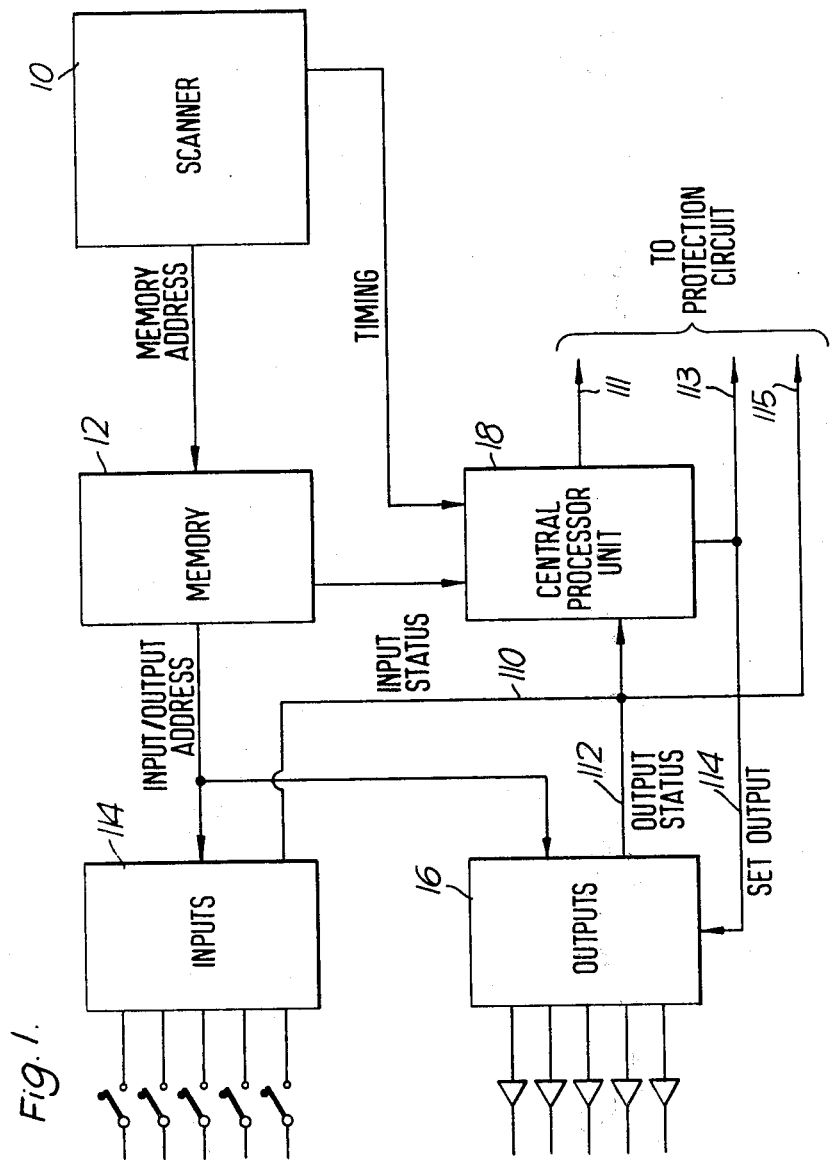
FIG. 1 is a block diagram of a typical computer based control system to which the protection circuit of the present invention is applicable.

Referring to FIG. 1, the operation of a typical computer based control system will now be described. Such a control system includes a scanner 10, having a clock and counter, which releases data from a memory 12 incrementally, the data being used to address a number of inputs 14 and a number of outputs 16 of the system and provide instructions to a central processor unit 18. The processor unit 18 reads the status of the inputs 14 and the outputs 16 through a single common connection 110 to every input and a single common connection 112 to every output, and sets the outputs accordingly through another single common connection 114 to every output. Alternatively, because of "fan-in/fan-out" limitations of the logic, control systems having substantial input/output capacity may have single connections to groups of, say, sixty-four inputs/outputs, and there could be four "status" connections between the processor unit 18 and the inputs 14 and outputs 16 and four "set output" connections between the processor unit 18 and the outputs 16 on a two hundred and fifty six input/output control system.

Since the outputs are only addressed for a relatively short period of time during each scan, each output 16 has some form of temporary storage to provide a continuous on or off signal. This temporary storage is usually provided by flip-flops. It should be noted that every output 16 which is utilised on the system is addressed one or more times, depending on the memory programme, during every scan.

Certain failure modes are particular to these systems over and above those which already exist on all control systems.

The firt mode is failure of the scanner 10 which will cause the system to hang-up at some point leaving whatever had been set in motion to continue. The scanner failure can be detected and some form of master disabling circuit arranged to turn off all outputs.

The second mode concerns a failure on the "set output" connections, which causes every output 16 which is being fed by the faulty "set output" connection to be energized e.g. if the "set output" signal has to be in the logic '1' state to set "on" an output then a continuous logic '1' on that line, will, within one scan period, energized every output 16 in the group of outputs connected to that line.

The third mode concerns a failure in the processor unit 18. There has to be some part in the processor unit 18 which takes the final decision to turn an output "on". If this piece of logic fails, then every output will be turned "on", and not just one group as in the case of the second mode.

The fourth mode concerns a failure on the status connections. In this case, as the processor unit 18 goes through each input/output status connection line and receives an "on" status from all of them, the processor unit will generate the setting output "on" for nearly every output. Some may escape due to the presence of NOT functions wherein the status line signal is inverted by the processor unit 18, but the likelihood is that this only applies to relatively few outputs, and the remainder will be permanently energized.

Note that any of the second, third and fourth failure modes can arise from a solitary open or short circuit condition, whichever gives rise to a logic '0' or '1' level that corresponds to the normal level required to set "on" an output. Furthermore, the situation is aggravated particularly on the status and set output connection lines because the status connection lines 110 and 112 are connected to the logic associated with each and every input and output respectively and the set output connection line 114 is connected to each and every output. Thus, there exists a very high probability of failures on these connections since systems containing several hundred inputs/outputs are quite typical.

Hence this type of computer based control system has particular and inherently more potentially dangerous failure modes over and above parallel hard wired solid state or relay control systems.

One solution would be to include overtravel limits in series with each output primemover with appropriate cross interlocking where two or more motions are involved. However, there are usually practical and economic limitations on making this comprehensive, although some degree is desirable and usual on important functions.

Another solution would be to monitor continuously the status and set output connections, and the processor unit 18, and derive a signal to disable all outputs when a failure is detected. This continuous monitoring may involve a relatively large amount of logic since it has to distinguish between normal and fault signals and as mentioned earlier, there may be several status and set output connection lines to be monitored. Obviously, the more complex the monitoring circuit, the greater is the chance of the monitoring circuit failing.

A solution according to the invention is a protection circuit which monitors the status and set output connections, and the processor unit 18, at a predetermined time during, or at the end of, each scan. Monitoring at the end of each scan is more suitable, but if faster monitoring is required then this could take place several times during each scan period. Monitoring at the end of each scan has the disadvantage that if a failure occurs at the beginning of each scan, all outputs could be energised for one scan period, typically 5 – 20 milliseconds. However, the advantage is that the protection circuit can be very simple and hence the mean time between failure of components in the protection circuit itself is relatively high. In any case, the response of the machine or process being controlled is not normally faster than the scan period of the control system.

Figure 2:
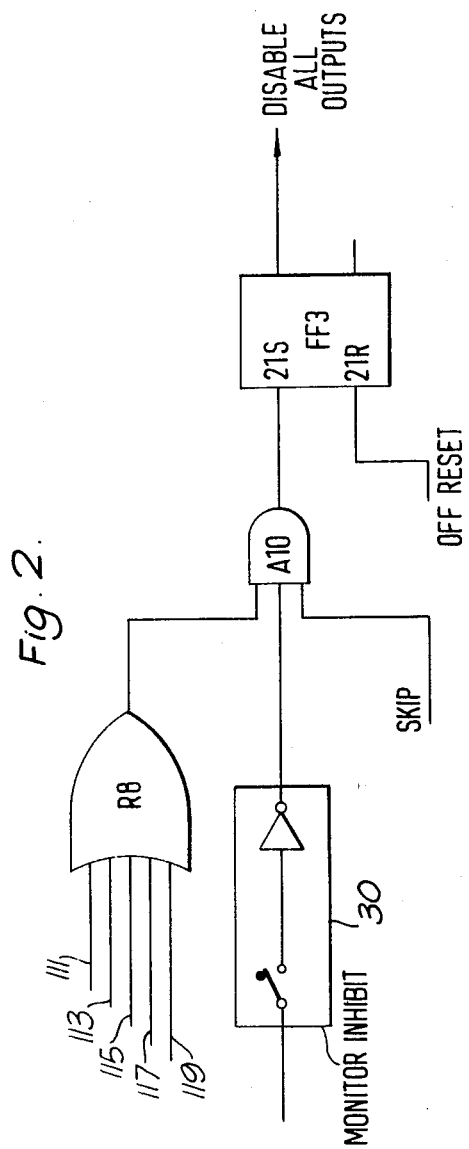
FIG. 2 is a basic block diagram of a protection circuit according to the present invention.

FIG. 2 shows a basic block diagram of a suitable protection circuit which comprises a bistable circuit in the form of a flip-flop FF3 which is connected to the outputs 16 of the control system and which is set to a first or OFF condition by an off return signal into a reset terminal 21R, when power is first applied to the system. A set terminal 21S of the flip-flop FF3 is connected to a first gating circuit in the form of an AND gate A10 having three inputs. A first of these inputs receives a signal at the end of each scan which signal may originate either from the scanner 10 or the memory 12 and a second of these inputs receives a signal from a second gating circuit in the form of an OR gate R8, which has inputs connected respectively to the processor unit 18 through line 111, each status connection through line 115 and each output connection through line 113. The gate R8 may also be provided with inputs from other points on the control system at which monitoring is desirable. Such inputs are fed through lines 117 and 119. At the end of each scan, however, before the processor unit 18 is enabled, i.e., during that time after the last piece of data in the memory has been read and whilst the processor unit 18 is returning the scanner 10 to zero and is ignoring status indications and is not permitted to set outputs, all the input signals to R8 should be at logic '0' unless a fault has occurred, assuming that these input signals need to be at logic '1' to set a control system output "on". Any such signals of opposite sign can be accommodated by the addition of an inverter (not shown) ahead of the OR input. This is the only time when all such input signals should be at logic '0'. If a fault occurs, gate R8 receives a logic '1' at one of its inputs, the AND gate A10 receives coincident input signals, the flip-flop FF3 receives a logic '1' at its set input 21S and all the outputs 16 of the control system are disabled.

If desired, a monitor inhibit circuit 30 to disable the monitoring as a servicing aid may be connected to the third input of the AND gate A10. As a further improvement "electronic crow-bars" may be provided to short circuit the set output signals and thereby to provide additional means to disable the system outputs 16, the "crowbars" being actuated by an output of flip-flop FF3. The electronic crowbars can take the form of a transistor connected to the set output connection 114 between the processor unit 18 and the output 16 and controlled by output of flip-flop FF3 of the protection circuit.

Figure 3:
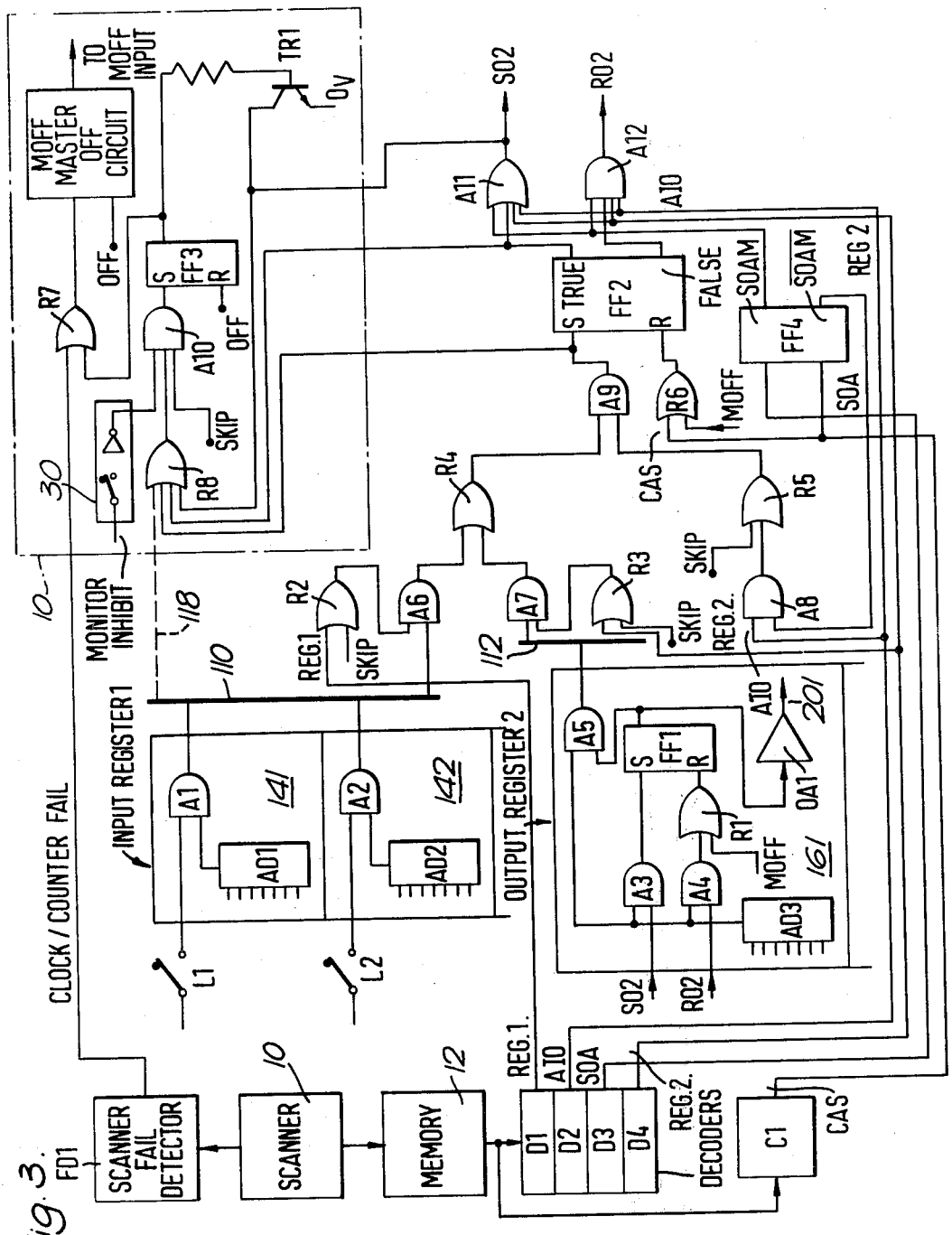
FIG. 3 is a more detailed block diagram of the protection circuit of FIG. 2, applied to a control system.

A more detailed operation of a typical control system will now be described with reference to FIGS. 3 and 4. Thereafter the operation of the protection circuit applied to the system will be described.

Each input and output has its own particular piece of logic and they are grouped together and referred to as input register 1 and output register 2 respectively. Each input and output is designated by a three digit number, the first digit being the register number, the second and third digits being the particular input or output in that register. Thus 101 is located in input register 1 and is input number 1. Similarly, 102 is input register 1, input number 2 and 201 is output register 2, output number 1.

The following example program will be considered:

| ROM WORD | INPUT/OUTPUT | Address or Instruction |
|---|---|---|
| 1 | 101 | Input number 1 |
| 2 | 102 | Input number 2 |
| 3 | SOA | Set Output Accordingly |
| 4 | 201 | Output number 1 |
| 5 | SKIP | Return to 1st ROM word |

The clock waveform drives a counter of the scanner 10 which releases words from the memory 12 sequentially. The scanner 10 steps on to a new word each time the clock goes from logic '1' to logic '0'. Information from the memory 12 is only read during the time when the strobe word program waveform is at logic '1'. This is necessary because at the instant the counter steps on, causing a change from one ROM word to the next, the memory output is indeterminate.

A simple "AND" operation of the system will be considered whereby two input signals (input number 1 and 2) are used to produce a desired output (output number 1). Thus, the system has an input register 1, having a first input 141 and a second input 142, and an output register 2 having an output 161.

Each input 141 and 142 has respectively an input address decoder AD1 and AD2, the output of which being connected to one input of an AND and A1 and A2 respectively. The other input of each of the gates A1 and A2 are fed through limit switches L1 and L2 respectively. The outputs of the AND gates A1 and A2 are connected to input status connection line 110. Normally the input register has more than two inputs, each input having its own address decoder, AND gate and limit switch.

The output 161 has an output address decoder AD3, an output flip-flop FF1 and an output amplifier OA1.

The set input of the flip flop FF1 is connected to the output of an AND gate A3, one input of which is connected to the output of the output address decoder AD3 and the other input of which is connected to a "set on" signal SO2 for the output register 2. The reset input of the flip flop FF1 is connected to the output of OR gate R1, one input of which is connected to the output of an AND gate A4 and the other input of which is provided with a master OFF signal, MOFF, as will hereinafter be described. The inputs of AND gate A4 are connected respectively to the output of the output address decoder AD3 and to a "reset off" signal RO2 for the output register 2.

The output of the flip-flop FF1 is fed to the output amplifier OA1 to energise the desired 201. The output of FF1 is also applied to an AND gate A5, the other input of A5 being connected to the output address decoder AD3. The output of gate A5 is fed to the output status connection line 112.

Again, the output register 2 normally has more than one output, the circuitry described above being repeated for each output.

Considering the example program, the normal operation of the control system will now be described.

The scanner 10 adresses ROM word number 1 and the first word 101 of the program is read by input address decoder AD1, and feeds a logic '1' to AND gate A1. When the limit switch L1 is closed, the second input is provided to AND gate A1. The status line 110 of input register 1 is therefore at logic '1', providing an input to an AND gate A6. A decoding circuit D1 then determines that the first ROM word is addressing register 1 and provides signal REG1 on one input of an OR gate R2. The AND gate A6 output now switches to logic '1' which is fed via an OR gate R4 to one of the inputs of an AND gate A9. Further, another decoding circuit D2 determines that the first ROM word is an input or output address and provides the signal A10 to one input of an AND GATE A8. If the other input signals to gate A8 are also at logic '1', as will be explained hereafter, the output of gate A8 switches to logic '1' which is fed via OR gate R5 to the second input of AND gate A9. Decision making flip-flop FF2 is now set with the TRUE output at logic '1'. The word program strobe now returns to logic '0' causing signals REG1 and A10 to return to logic '0'. The scanner 10 now steps on to address to second ROM word, 102.

Input address decoder AD2 feeds a logic '1' to AND gate A2 since the second input to gate A2 is completed by limit switch L2, the status line of register 1 is again at logic '1'. The operation proceeds as described for the 1st ROM word, until the scanner steps on to address the 3rd ROM word, SOA.

The third word is an instruction to set an output on or off, since it is not an input or output address the address decoders AD1, AD2 and AD3 outputs remain at logic '0', which ensures that the status lines for registers 1 and 2 also remain at logic '0'. The SOA instruction is decoded by decoder D3 and remembered by setting on a flip-flop SOAM FF4, in readiness for the next output which is to be acted upon by the SOA command. The scanner 10 then steps on to the fourth ROM word, 201.

The fourth word is read by output address decoder AD3 which feeds a logic '1' to AND gates A3, A4 and A5. A decoding circuit D4 recognises that this word is addressing output register 2 and provides signal REG2 for the inputs of OR gate R3 and AND gates A11 and A12. Since flip-flop FF4 is at logic '1' the complement SOAM fed to the input of AND gate A8 ensures that the output of AND gate A9 remains at logic '0' and status of register 2 cannot influence the state of flip-flop FF2. Also, the signal A10 becomes a logic '1' satisfying all inputs of AND gate A11. The output of gate A11 provides a "set on" signal, SO2, which sets flip-flop FF1 through AND gate A3, and energized output 201, via output amplifier OA1.

If FF2 had been in the reset condition with TRUE at logic '0' and FALSE at logic '1', then a "reset off" signal, RO2, would have been supplied to AND gate A4 which would reset FF1 and de-energise output 201. Note that although SO2 and RO2 feed every output circuit of register 2, the only one which responds is the one which is being addressed at that particular time. When the word strobe goes to logic '0' it initiates a circuit C1 which generates a clear after SOA signal, CAS, to reset FF2 and the SOAM flip-flop FF4. The scanner 10 then steps on to address the fifth ROM word, SKIP.

The SKIP instruction when read is used in the protection circuit and also to initiate the resetting of the scanner 10 to allow the program to repeat.

The operation of the protection circuit 10 will now be described.

Failure of the clock and/or counter of the scanner 10 at any time is detected by a Scanner Fail Detector circuit FD1, and is fed via OR gate R7 into a master off circuit, M OFF, to reset the output register flip-flop FF1.

The M OFF circuit is arranged to latch so that if a failure occurs it is necessary to reset it either manually or by interrupting power to the control system.

The monitoring only operates during the last word of the program, i.e., when the word SKIP is read. If a fault occurs at the start of the program or anywhere in between the start and the last word the monitoring will ignore the condition until SKIP is read.

The logic AND gate A11 is assumed to fail in a dangerous condition i.e., permanent logic '1', shortly after the scanner addresses word 3. This condition is shown dotted on the SO2 waveform of FIG. 4. As each output is addressed, this would set them "on" regardless of the state of FF2 and in the course of one program scan energise every output. This is the second failure mode described earlier. When the SKIP instruction is read and assuming the switch of the monitor inhibit circuit 30 is open, the logic '1' from AND gate A11 is already at an input of AND gate A10 via OR gate R8, and gate A10 sets "on" FF3 which initiates the M OFF circuit, resetting all outputs "off", as shown in FIG. 4 on the output 201 waveform. Optionally, FF3 can feed a transistor TR1 to act as a "crowbar" and short out the SO2 signal from AND gate A11. FF3 can be reset by interrupting power to the system and rendered inoperative by closing the inhibit monitor switch as an aid to fault location.

A failure of FF2 in which the TRUE output became a permanent logic 1, would in one scan set "on" every output. This is the third failure mode described earlier. Normally at the end of a program scan the TRUE output of FF2 would have been reset to logic '0' having completed its operation on the last word and in preparation for receiving information for commencement of the first word. In the event of an FF2 failure (i.e., TRUE output permanently at logic '1') OR gate R8 goes to logic '1' and the system is again shutdown when the word SKIP is received by AND gate A10.

Failure of the register status connection lines 110 or 112 is potentially dangerous because most outputs are conditional upon several inputs being simultaneously energized, therefore if the input status line 110 fails permanently to logic '1' indicating that all inputs are made, there exists a high probability that many outputs will be erroneously energised. This is the fourth failure mode described earlier.

The logic level on the status lines will be known when the SKIP instruction is being read because no inputs (or outputs) are being addressed and therefore the outputs of AND gates A1, A2 and A5 will be at logic '0' unless a failure has occurred. In a small simple controller it is possible to monitor all the register status lines as well as the logic between the register status lines and the decision making flip-flop FF2, by feeding the SKIP instruction into OR gates R2, R3 and R5, and monitoring the output of AND gate A9. This has the effect of "opening" all AND gates to read the status lines during the SKIP instruction and checks every input register gate such as AND gates A1 and A2 and every output register gate such as AND gate A5 in addition to AND gates A6 and A7, OR gate R4 and AND gate A9. Note that this does not detect a gate failure unless it has failed in a way which results in a logic '1' on the output of AND gate A9 which is the worst case. For example, if AND gate A2 fails and its output remains at logic '0' when both inputs are energized, then although the controller would no longer respond to input 102, the result would not be catastrophic. However, if AND gate A2 fails and its output remains at logic '1' then the results may well be serious, since it instructs the controller that all inputs are on. This condition would be detected by the monitoring circuit when the SKIP instruction is read.

On complex equipment there may be a large amount of logic between the status lines and the final decision making logic, and it may not be possible to use the SKIP instruction to interrogate the logic as described above. It would then be necessary to use dotted connection 118 in FIG. 3 from each status line into the OR gate R8. It will be appreciated that the decoders D1 to D4, the circuit C1, gates R2, A6, R4, A7, R3, A8, R5, A9, R6, A11 and A12 together with flip-flops FF2 and FF4 of FIG. 3 form part of the central processor unit 18 of FIG. 1.

What is claimed is:

1. In a computer based control system, a protection circuit comprising first and second gating means responsive to input signals from the control system for generating output signals, and disabling means responsive to the output signal from said first gating means for disabling the output of the control system, and input of the first gating means receiving an input signal at a predetermined time, or at the end of, a scan period of the control system, another input of said first gating means connected to the output of the second gating means, said second gating means having a number of inputs each connected to a respective part of the control system so that said second gating means passes its output signal to said first gating means on an occurrence of a fault at any one of said parts of the control system and said second gating means interrogates said number of inputs before an address of the control system takes place to determine that said parts of the control system are in the right state for causing said first gating means to activate, at said predetermined time, said disabling means for disabling all outputs of said control system.

2. A protection circuit as claimed in claim 1 wherein said disabling means includes a bistable circuit.

3. A protection circuit as claimed in claim 1 wherein said first gating means is an AND gate, one input of which is arranged to receive said signal at said predetermined time, and the other input of which is arranged to receive a coincident signal from said second gating means when a fault is monitored.

4. A protection circuit as claimed in claim 1 wherein said second gating means is an OR gate which, at said predetermined time, is arranged to receive a signal at an input only if a fault is monitored in a connected part of the control system.

5. A protection circuit for a computer based control system said protection circuit comprising a bistable circuit having an output connectable to outputs of the control system and an input connected to an AND gate which is arranged to receive a signal at a predetermined time during, or at the end of, a scan period of the control system, and which has an input connected to an output of an OR gate, the latter having inputs connectible to the control system such that the protection circuit can, at said predetermined time, monitor faults in the control system and disable all outputs thereof.

* * * * *